US008886559B2

(12) United States Patent
Klein

(10) Patent No.: US 8,886,559 B2
(45) Date of Patent: Nov. 11, 2014

(54) MOBILE PRODUCT DETECTING SYSTEM AND METHOD THEREFOR

(75) Inventor: Gordon Klein, Dallgow (DE)

(73) Assignee: Wincor Nixdorf International GmbH (DE)

( * ) Notice: Subject to any disclaimer, the term of this patent is extended or adjusted under 35 U.S.C. 154(b) by 0 days.

(21) Appl. No.: 13/505,227

(22) PCT Filed: Oct. 7, 2010

(86) PCT No.: PCT/EP2010/006117
§ 371 (c)(1), (2), (4) Date: Apr. 30, 2012

(87) PCT Pub. No.: WO2011/057695
PCT Pub. Date: May 19, 2011

(65) Prior Publication Data

US 2012/0221424 A1 Aug. 30, 2012

(30) Foreign Application Priority Data

Nov. 16, 2009 (DE) ......................... 10 2009 044 537

(51) Int. Cl.
*G06Q 20/20* (2012.01)
*G07G 1/00* (2006.01)

(52) U.S. Cl.
CPC ............ *G07G 1/0063* (2013.01); *G07G 1/0081* (2013.01)
USPC ............................... 705/23; 705/16; 705/27.1

(58) Field of Classification Search
USPC ............................................ 705/23; 235/375
See application file for complete search history.

(56) References Cited

U.S. PATENT DOCUMENTS

| | | | | |
|---|---|---|---|---|
| 3,708,655 | A | 1/1973 | Schanne | |
| 4,373,133 | A | 2/1983 | Clyne et al. | |
| 5,115,888 | A | 5/1992 | Schneider | |
| 5,252,814 | A | 10/1993 | Tooley | |
| 5,540,301 | A * | 7/1996 | Dumont | 186/61 |
| 5,543,607 | A | 8/1996 | Watanabe et al. | |
| 6,142,376 | A | 11/2000 | Cherry et al. | |
| 6,672,506 | B2 * | 1/2004 | Swartz et al. | 235/383 |

(Continued)

FOREIGN PATENT DOCUMENTS

| | | |
|---|---|---|
| DE | 2 264 518 | 1/1974 |
| DE | 69206438 T2 | 5/1996 |

(Continued)

OTHER PUBLICATIONS

Clodfelter, Guy Richard. "Pricing accuracy at grocery stores and other retail stores using scanners." International Journal of Retail & Distribution Management 26.11 (1998): 412-420.*

(Continued)

*Primary Examiner* — Matthew Gart
*Assistant Examiner* — Talia Crawley
(74) *Attorney, Agent, or Firm* — Harness, Dickey & Pierce, P.L.C.

(57) ABSTRACT

The invention relates to a system for detecting products, comprising a plurality of portable reading devices, wherein each customer can be assigned at least one portable reading device by means of which identification data about the products to be purchased by the respective customer in a sales room can be detected irrespective of location, and wherein the portable reading device has a control unit and a memory for buffering the identification data.

16 Claims, 2 Drawing Sheets

(56) References Cited

U.S. PATENT DOCUMENTS

| | | | | |
|---|---|---|---|---|
| D536,192 | S | 2/2007 | Kruse et al. | |
| 7,246,745 | B2 | 7/2007 | Hudnut et al. | |
| 7,387,241 | B2 | 6/2008 | Hassenbuerger | |
| 7,407,056 | B2 | 8/2008 | Lutz | |
| 7,673,796 | B2 | 3/2010 | Kobres et al. | |
| 8,074,785 | B2 | 12/2011 | Twiste | |
| 2001/0015375 | A1 | 8/2001 | Swartz et al. | |
| 2004/0238629 | A1 | 12/2004 | Buchholz | |
| 2005/0097064 | A1 | 5/2005 | Werden | |
| 2005/0098633 | A1 | 5/2005 | Poloniewicz et al. | |
| 2006/0266824 | A1 | 11/2006 | Hassenbuerger | |
| 2006/0283943 | A1 | 12/2006 | Ostrowski et al. | |
| 2008/0110724 | A1 | 5/2008 | Twiste | |
| 2008/0296382 | A1* | 12/2008 | Connell et al. | 235/462.01 |
| 2008/0296392 | A1* | 12/2008 | Connell et al. | 235/472.01 |
| 2009/0039164 | A1 | 2/2009 | Herwig et al. | |
| 2009/0039165 | A1 | 2/2009 | Collins, Jr. et al. | |
| 2009/0090583 | A1* | 4/2009 | Bonner et al. | 186/59 |
| 2009/0212102 | A1* | 8/2009 | Connell et al. | 235/375 |
| 2010/0072220 | A1 | 3/2010 | Michels | |
| 2010/0258381 | A1 | 10/2010 | Baitz et al. | |
| 2012/0018520 | A1 | 1/2012 | Twiste | |

FOREIGN PATENT DOCUMENTS

| | | | |
|---|---|---|---|
| DE | 19708020 | C1 | 8/1998 |
| DE | 202 06 878 | U1 | 8/2002 |
| DE | 10141429 | C1 | 1/2003 |
| DE | 10207568 | A1 | 9/2003 |
| DE | 102 35 865 | A1 | 2/2004 |
| DE | 20 2005 007 089 | U1 | 7/2005 |
| DE | 202004021433 | U1 | 3/2008 |
| DE | 10 2008 044 795 | A1 | 3/2010 |
| DE | 20 2008 012 862 | U1 | 2/2011 |
| DE | 102009043841 | A1 | 3/2011 |
| DE | 102009044156 | A1 | 4/2011 |

OTHER PUBLICATIONS

Hawkes, Peter. “Supertag-stock counting off its trolley.” Sensor Review 14.3 (1994): 23-25.*

International Search Report in German (with English Translation) and Written Opinion (in German) for PCT/EP2010/006117, mailed Dec. 17, 2010; ISA/EP.

International Search Report (in German with English Translation) and Written Opinion (in German) for PCT/EP2010/005759, mailed Dec. 15, 2010; ISA/EP.

* cited by examiner

MOBILE PRODUCT DETECTING SYSTEM AND METHOD THEREFOR

CROSS-REFERENCE TO RELATED APPLICATIONS

This application is a National Stage of International Application No. PCT/EP2010/006117, filed Oct. 7, 2010, and published in German as WO/2011/057695 A1 on May 19, 2011. This application claims the benefit and priority of German Application 10 2009 044 537.4, filed Nov. 16, 2009. The entire disclosures of the above applications are incorporated herein by reference.

BACKGROUND

This section provides background information related to the present disclosure which is not necessarily prior art.

1. Technical Field

The invention relates to a system for detecting products comprising a plurality of portable reading devices, whereby at least one portable reading device is assigned to a customer by means of which identification data for products to be purchased by the respective customer can be detected in a sales room regardless of the customer's location, and wherein the portable reading device has a control unit and a memory for buffering the identification data, a receptacle unit disposed in the exit area of the sales room having a plurality of receptacles for the portable reading devices, a control device by means of which the identification data from the portable reading device can be read and transmitted to a registration device for issuing registration information identifying the product purchase, and a payment unit for concluding a payment process on the basis of the registration information.

2. Discussion

The invention further relates to a method for detecting products, wherein by means of a portable reading device identification data for products to be purchased can be read regardless of their location in a sales room and buffered until the identification data, after the portable reading device is placed in a receptacle of a receptacle unit located in an exit area of the sales room, are transmitted to a registration device to output the registration information required for the payment process for the detected products.

A self-service product detection station is known from DE 20 2004 021 433 U1 at which customers independently and completely perform the detection of products and subsequent payment for said products usually performed by a register clerk. The self-service product detection station thus has a suitable reading device for detecting a specific number of products, wherein the reading device may be configured as an infrared scanner. After reading barcodes from the products, for example, these product-specific identification data are provided by the reading device to a registration device in which registration information, or price data, are assigned to the products detected so that said price data are displayed in a display unit, for example a touch-sensitive screen and the customer is requested to pay a total amount. For this purpose, the self-service product detection station has a payment unit so that the customer can undertake the payment process independently, where the payment unit can have a card swipe reader to make a cash-free payment. After paying for the products detected, the customer receives a register slip (receipt) from a dispensing slot, usually showing the individual products with their prices and the total. In order to check that all the products presented by the customer at the product detection station are detected by the reading device, a weighing device is provided with a floor scale arranged on both sides of the reading device. Each time that a product is scanned, a weight comparison is conducted of the two respective floor scales holding a shopping cart. If the increase in weight of one floor scale matches the decrease in weight of the other floor scale, it is assumed that the scanning process has been properly carried out by the customer so that the customer is requested audibly or visually to scan another product. With incorrect use in particular, this weight check results in malfunctions that require the intervention of an attendant.

A system is known from the subsequently published German application DE 10 2009 044 156 for detecting products at a stationary product detection station at which the customer detects products intended for purchase by means of a stationary reading device. Identification data for the products are detected and fed to a registration device so that registration information is collected and output in the form of a purchase receipt. Subsequently the customer can conclude the purchase process at a payment unit by making the payment. In order to check that the product detection process is complete, an optical control detection unit is provided, by means of which some of the products detected by the customer are additionally detected on a random basis. The identification data for the products detected ascertained by this method are compared with the identification data detected by the stationary reading device and checked for conformity. Following sequential checking, a verification signal is generated if the identification data are consistent, so that the payment process can be concluded by the customer. If a non-conformity is determined, that is to say if a product is detected by means of the optical control detecting unit that has not been detected by the customer himself, a correction signal is generated so that steps can be taken to the effect that the product not detected by the customer can be detected by the stationary reading unit and the purchase process can be concluded by payment. Detection of the products by the customer is not carried out by a mobile reading unit.

SUMMARY OF THE INVENTION

An object of the present invention is, therefore, to cite a system and a method for detecting products using a portable reading device during the purchasing process in such a way that checking the purchasing process with respect to the completeness of the products detected by the customer can be completed more simply and more quickly.

In order to achieve this object, the invention is characterized in that an optical control detection unit is provided to detect a number of products that is smaller than the total number of products presented for the purchase process, wherein identification data are assigned to products detected by the control detection unit, and a verification unit by means of which the identification data of the products detected by the optical control detection device are checked for conformity with the identification data detected by the portable reading unit so that, depending on the comparative result, a verification signal continuing the purchase process to initiate the payment process or a correction signal to interrupt the purchase process is generated.

The specific advantage of the invention is that by using an optical detection unit that detects a number of products presented for purchase at the product detection station the verification for possible discrepancies during the product detection process by the customer can be simplified or the purchasing process can be speeded up. Using the optical control unit makes it possible to detect, or scan, the products without interfering with the steps to be performed by the customer, such as scanning and paying for the products. Because the customer has already scanned or read the products intended for purchase during his passage through the sales shelves using the portable reading unit, the final purchase process can be speeded up in the exit area of the sales room since only payment for and random checking of the products detected by the customer occurs.

The identification data provided by the optical control detecting unit for the products detected are made available to a verification unit in which a comparison is made with the identification data from the products detected by the customer. In the event that non-conformity is established, it is assumed that the customer has not scanned the product in question, either inadvertently or with intent to deceive. In this case, a suitable correction signal is issued by means of a reporting unit so that an assistant, for example, can intervene in the purchasing process with the result that the product not detected by the customer is subsequently detected.

In accordance with a preferred embodiment of the invention, the effect of a verification unit on the optical control detection unit is that only one part of the products presented is detected. As a result of this random-sample detection of the products, the volume of information and the time of inspection can be kept small so that product information can be almost one-hundred percent. As a result of the products presented for purchase being detected on only a random basis by the control detection unit, positive confirmation can be achieved prior to the conclusion of the purchase process by the customer without false alarms because of faulty product detection.

In accordance with a preferred embodiment of the invention, the optical control detection unit has an image detection device, specifically a digital camera so that it is possible to achieve relatively high (100%) identification reliability of the products, with suitable object detection software. The image detection device is preferably programmed in such a manner with the image detection software that all products, if possible, are detected at least partially. By presetting a random sample size of 30% of all products detected or presented, the image data for those products are further processed that have been definitively detected.

In accordance with a further development of the invention, the control detection device has a number and/or arrangement of image detection devices such that the products deposited on a placement table located next to the payment unit and/or the products placed in the shopping cart are detected by the optical control device. This ensures that a large number of products can be detected with a high degree of certainty of identification.

In order to achieve its object, the method in accordance with the invention is characterized in that after the portable reading device has been placed in the receptacle unit, an additional number of the products in the placement area is optically detected and the identification data thus detected is checked with the identification data already detected by the portable reading device so that, depending on the conformity check, an actuation signal to continue the purchase process by means of payment or a correction signal to interrupt the purchase process is generated.

The particular advantage of the method in accordance with the invention is that a check for inconsistency regarding the products detected by the customer can be made quickly and reliably. As a result of the products presented for purchase being detected on only a random basis, the confirmation within the purchase process presented by the customer can be concluded rapidly. Secondly, a relatively high certainty of identification (almost 100%) in identifying the products can be achieved since only unambiguous identification data from the products detected are used for the random sample detection. As a result of the verification in accordance with the invention preferably taking place without the participation of the customer, the purchase process can be completed relatively quickly. Since the verification by means of the optical checking unit takes place in parallel to the purchase process, the purchase process does not have to last longer for the customer than in the case of non-verification. The random sample can refer to the purchase process of each individual customer or of a group of customers so that in the latter case product detection is not verified by each customer.

In accordance with a further development of the invention, the verification for conformity of the products detected by the customer with the randomly detected products takes place immediately after the portable reading device is placed in the receptacle unit. From this point on, the products are optically detected and inspected randomly. By comparing the corresponding identification data, a verification result can be obtained relatively quickly. In this, the product-specific identification data detected randomly by a control detection device from the products are transmitted automatically to a verification unit in which the comparison is conducted. As an alternative, image data detected by the optical control detection device can be visualized in a preferably remotely located monitor so that individual products can be identified individually by a checker and then, by selecting a suitable checking program, verification is carried out whether the product identified corresponds to a product detected by the customer. The verification takes place using a registration list provided for the payment process so that in the event of faulty product detection by the customer, the correction in the purchase process can usually take place after the payment process has commenced.

In accordance with a further development of the invention, only fewer than one half of all the products presented for the purchase process, preferably about 30% of the products presented for the purchase process, are fully detected and taken for a conformity check. Consequently, there is an assurance that a high reliability in identification is a given.

BRIEF DESCRIPTION OF THE DRAWINGS

Embodiments of the invention are explained in greater detail hereinafter using the Figures.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Figure 1:
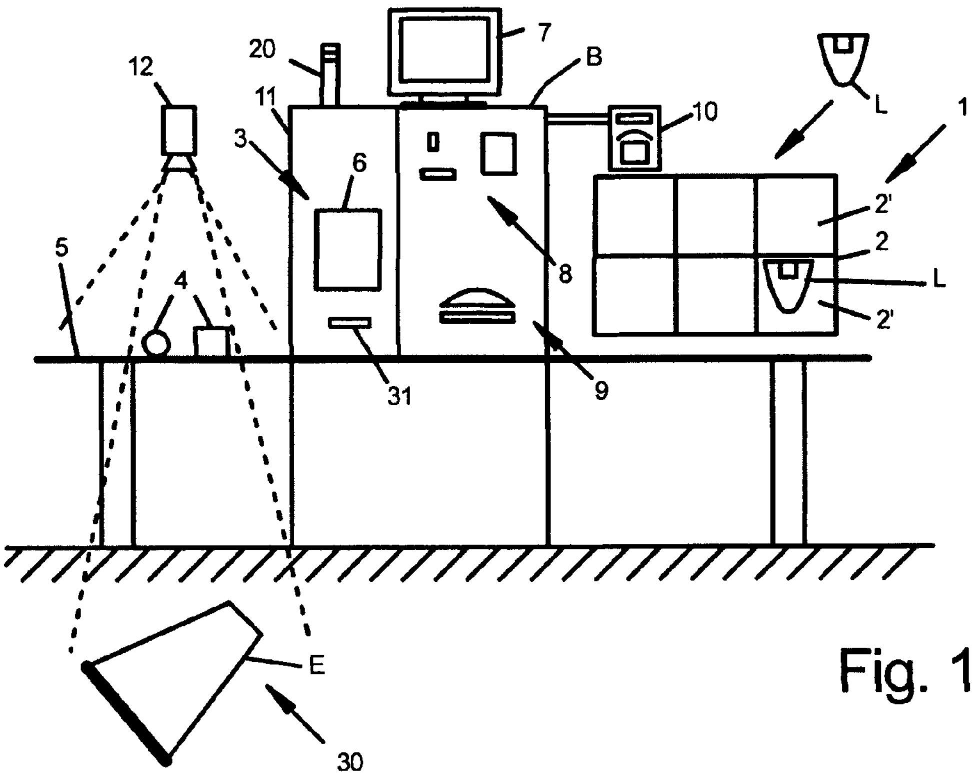
FIG. 1 shows a schematic side view of a product detection station with an optical control unit and a payment unit.

Example embodiments will now be described more fully with reference to the accompanying drawings.

A product detection station 1 is located in an exit area of a sales room and has a registration unit 11 with a stationary reading device, an adjacent payment unit B, and receptacle unit 2 to receive a plurality of portable reading devices L and an optical control detection device 12.

The receptacle unit 2 has a plurality of receptacles 2' in which the portable reading unit L can be placed. The customer has received the portable reading unit L in an entry area of the sales room after registration of said unit and or identification of said device. During his progress through the sales room, he has been able to read product information by means of the scanner integrated in the portable reading device and visualize this information by means of the integral display. The portable reading device L is designed as a mini-computer, for example as a PDA with an integral scanner. The portable reading unit L has a control unit and a memory for buffering identification data $K_1$ detected by the scanner. In addition, the portable reading device L makes it possible for the customer, when removing the products 4 from the sales shelf, for example by reading a barcode, to be able to detect identification data $K_1$ for the products 4 and to buffer them in a memory. In this way, the products 4 presented for purchase are detected sequentially by the portable reading device 4 and placed in the shopping cart E subsequent to their detection. After the products 4 to be purchased by the customer have been detected by the portable reading device L regardless of their location, the shopping cart E of the customer is positioned at a specified deposition location 30, preferably identified by markings. The portable reading device L is placed in an empty receptacle 2' of the receptacle unit 2. Through the portable reading device L making electrical contract with an interface in the receptacle unit 2, a registration routine and a verification routine are started by means of a control unit not shown.

The registration routine comprises the transmission of the identification data $K_1$ buffered in the portable reading device L to the registration device 11 in which the product-specific identification data $K_1$ are further processed to the effect that corresponding registration information, that consists essentially of a list of the products detected 4 and the matching prices and the total amount, are displayed on a screen 7. In addition, a registration receipt or proof of purchase is printed out by means of a printer integrated in the registration unit 11 and issued from a slot when the verification routine has been completed successfully.

Figure 2:
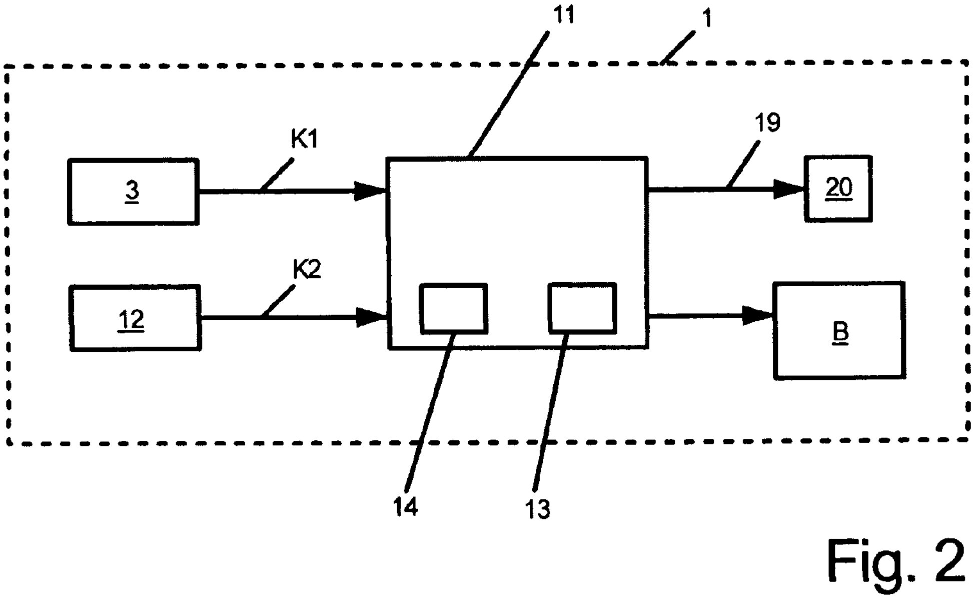
FIG. 2 shows a block diagram of product detection verification with a first embodiment and FIG. 3 shows a block diagram of product detection verification in accordance with a second embodiment.

The verification routine comprises a random check of the products 4 provided by the customer in the placement area 30 by the optical control detection device 12. The optical control detection device 12 has an optical image detection apparatus 12 located above a placement table 5 that may be configured as a digital camera with a CCD sensor. The placement table 5 is preferably located immediately next to the registration device 11. The camera 12 is spaced apart from the placement table 5 in such a manner that both the products 4 deposited on the placement table 5 and the products located in the shopping cart E in front of the placement table can be detected. The image data generated by the camera 12 are transmitted, in accordance with a first embodiment of the invention from FIG. 2, as identification data $K_2$ to the registration unit 11. The registration unit 11 has a verification unit 13 in which the image data $K_2$ provided by the optical control detection device 12 are processed. Specifically, the registration unit 11 may have a check and control program 14 by means of which its image data $K_2$ for only a part of the identification data $K_2$ corresponding to the entire products 4 presented are taken for verification. This selection of the identification data $K_2$ is made on a random basis, wherein less than half of the products 4 detected by the control detection device 12 and provided by the customer for the purchase process are taken for verification. In consequence, reliability of the identification of the products correspondingly detected 4 in particular can be improved, so that incorrect detection can be excluded. It is sufficient, for example, to take a maximum random sample of 30% of the products presented 4 for verification.

This random sample does not need to relate to the products of a single customer. Provision can also be made for the sample to relate to products 4 of a group of customers, so that it may happen that on occasion the products 4 presented by a customer are not verified for conformity with the products 4 in fact detected by the customer.

The verification unit 13 has, in addition, a comparison program 15 by means of which the conformity of the products 4 additionally detected by the control detection device 12 with the products 4 detected by the customer is inspected. For this purpose, the appropriately provided identification data $K_1$ from the products 4 that the customer has detected by means of the portable reading unit L are compared in each instance with the identification data $K_2$ that the control detection device 12 has detected.

Figure 3:
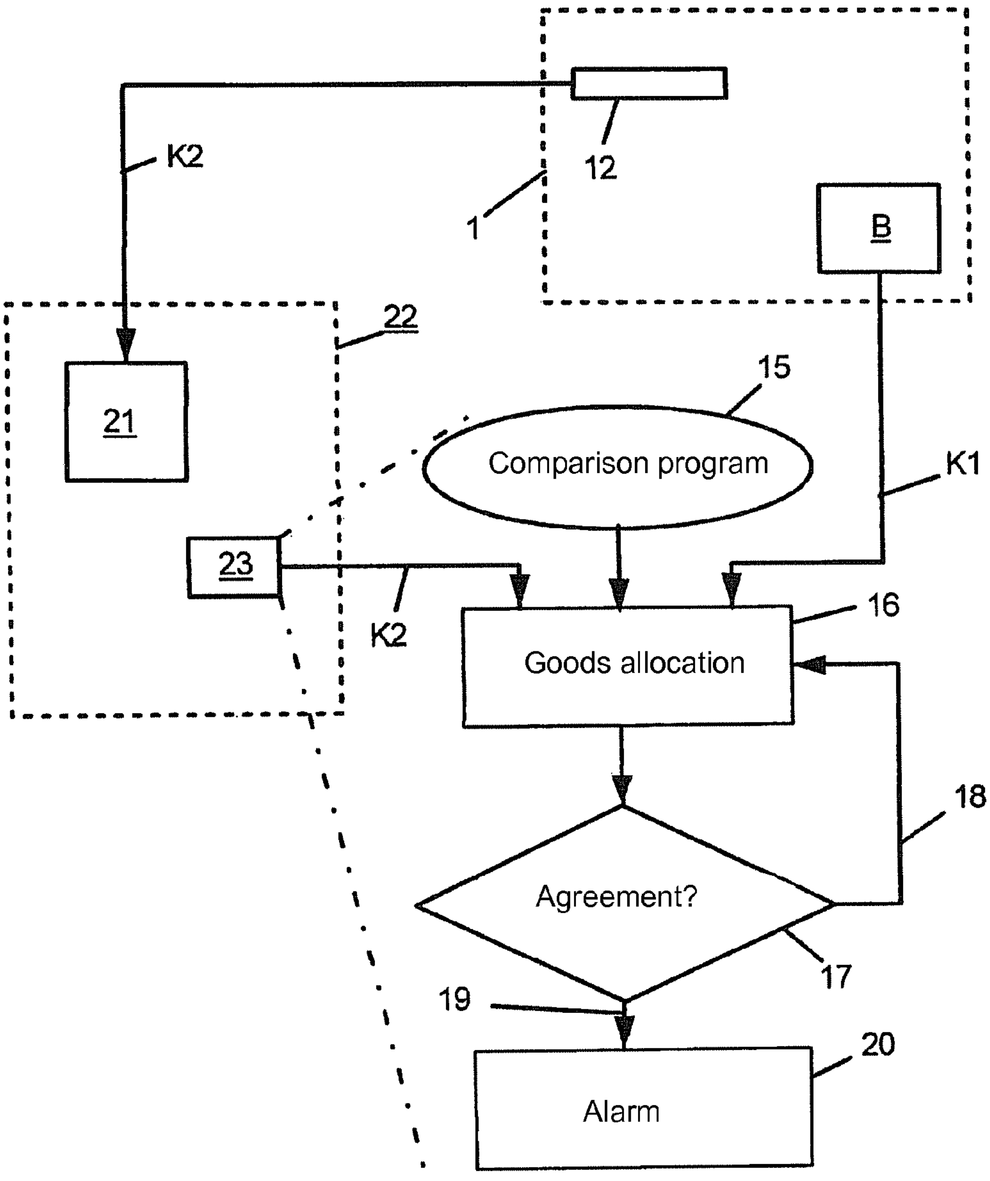

As can be seen in particular from FIG. 3, by means of the comparison program 15 following sequential assignment of the identification data $K_2$ to the identification data $K_1$ in accordance with step 16, the identification data $K_2$ from the products controlled 4 are gradually compared in a further step 17 with the identification data $K_1$ generated by the customer through the portable reading device L. If conformity could be established, an actuation signal 18 generated so that the identification data $K_2$ for the following products 4 can be checked. If the conformity is negative, a correction signal 19 is generated that is transmitted to a message device 20 to emit an alarm signal. As an example, the message device 20 may consist of a signal beam generating a red light that rises in columnar form from the registration unit 11. If such a correction signal 19 is generated, it may be assumed with great certainty that the customer has not scanned the product 4 detected at random by the control detection device 12 so that the purchase process can be interrupted and with the assistance of a supervisory person the appropriate scanning procedure for the product in question 4 can be repeated.

If the conformity of all products 4 detected that were randomly sampled is established, the actuation signal 18 prompts the issuance of the proof of purchase by means of a printer integrated in the registration device 11. The customer can now conclude the purchase at the payment unit B by payment in cash or cash-free payment using a bank card. The payment process can take place using cash or be cash-free. For payment using cash, the payment unit B has a slot 8 for coins and/or bank notes and a return slot 9 for change. A card reader 10 extends from the payment unit B for cash-free payment.

After payment has been made, a final receipt is issued through the payment unit B bearing a release code for an exit door from the sales room. This may be a bar code, for example, so that the exit door is opened automatically by means of a bar code scanner located at the exit door so that the customer can leave the sales room.

In accordance with an alternative embodiment of the invention from FIG. 3, in contrast to the aforementioned embodiment, the image data detected by the control detection device $K_2$ are transmitted to a remotely located monitor 21 at a control station 22 and visualized there. The image data $K_2$ can be composed of lettering, for example a bar code on the products 4, and/or a shape and/or a size and/or a graphical representation of the products 4. It is essential that the control person provides only image data $K_2$ of such products 4 for verification that are unambiguously identified.

A control person sitting at the control station 22 can now identify in sequence according to a predetermined scheme or in any order products 4 identified, and select these identified products 4 in a verification unit 23. For this purpose, the verification unit 23 may have, for example, a number of pictogram keys that in turn are assigned to a specific category of products 4 or products 4 themselves. Alternatively, the control person can also enter a code corresponding to the detected products 4 into an entry unit of the verification device 23.

As described above concerning the first embodiment, the random verification of the products 4 detected by the control detection device 12 with the products 4 detected by the portable reading device 3 is carried out in the verification unit 23.

In accordance with an alternative embodiment of the invention, the transfer, in accordance with the first embodiment and the second embodiment, of the identification data $K_2$ provided by the control detection device 12 to the comparison program 15 can also be undertaken superimposed. As a result, redundancy, or greater control reliability, is created.

In accordance with a further embodiment of the invention, and in addition or as an alternative to the automatic detection of the products 4 by the optical control detection device 12, the control unit can be configured in such a manner that the customer is requested by a display on the screen 7 to place the products 4 in the shopping cart E on the placement table 5. The placement table 5 and the placement area 30 together form a placement area for the products intended for purchase 4.

The request to the customer can be generated randomly or be made manually by a supervisory person. The concealed manual activation by the supervisory person is preferably used when the supervisory person harbors a suspicion that the customer has not scanned all the products 4 intended for purchase by means of the mobile reading device L. As soon as the customer has confirmed by a corresponding entry on the touch-sensitive screen 7 that all products 4 have been placed on the placement table 5, detection of the products 4 by the optical control device 12 can proceed. This verification process can, as described above, be observed by a supervisory person by means of a remote monitor 21. If consistency is established, the proof of purchase is printed by the registration device 11 so that payment can be made subsequently. As an alternative, the comparison between the randomly sampled products 4 with the products detected by the customer 4 can be made after the customer selects the method of payment. If an inconsistency is established, a suitable alarm signal is triggered so that a supervisory person can make the additional necessary arrangements. Preferably, the non-scanned products can be scanned using the stationary reading device 3 and the payment process can proceed subsequently.

It is understood that the embodiments named may be combined with each other. For example, the automatic release process can be assigned to each of the embodiments named as long as a payment has been made. With payment made, the final chit can show the release code by means of which the exit door from the sales room can be opened automatically.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A system for detecting products comprising:

a plurality of portable reading devices wherein at least one portable reading device is assigned to respective customers, wherein identification data for products to be purchased by a customer can be detected in a sales room regardless of location, and wherein the portable reading device has a control unit and a memory for buffering the identification data a receptacle unit located in an exit area of the sales room having a plurality of receptacles for the portable reading devices, a control device, wherein the identification data from the portable reading device can be read and transmitted and a registration device to output registration information identifying a product purchased by a customer, a payment unit to conclude a payment process based on the registration information, an optical control detection device located in the exit area of the sales room, to detect images of a preset number of products that is smaller than a total number of products presented for purchase by a customer and detected by the portable reading device, wherein identification data is assigned to the products by the optical control detection device and a verification device, wherein the identification data for the products detected by the optical control detection device are checked for conformity with the identification data of the products detected by the portable reading device so that, depending on a comparison result an actuation signal to continue sales to the customer and initiate a payment process or a correction signal interrupting the sales process is generated, and wherein the payment process is completed without weighing the products if the actuation signal is generated by the verification device.

2. The system according to claim 1, wherein the verification device has a control and checking program, wherein the identification data detected by the optical control detection device, depending on a degree of identification of the products, is taken for checking for conformity with the identification data detected by the portable reading device.

3. The system according to claim 1, wherein the optical control detection device is configured as an image detection apparatus, wherein lettering, and/or a shape and/or a size and/or a graphical representation of the product can be detected.

4. The system according to claim 1, wherein the portable reading device has a control unit with a memory for buffering the identification data and a bar code reader.

5. The system according to claim 1, wherein the control detection device has a plurality and/or an arrangement of digital cameras such that the products presented for purchase can be detected in a specified placement area, wherein the placement area may comprise a placement table located next to the payment unit and/or a shopping cart located at a specified location.

6. The system according to claim 1, wherein the verification device has a data processing unit with a comparison program, wherein the consistency of the products detected by the optical control detection device can be checked against the products detected by the portable reading device.

7. The system according to claim 1, wherein a reporting device to issue the actuation signal and/or the correction signal is located at the payment unit.

8. A method for detecting products, said method comprising:

scanning and storing a first set of identification data for all of the products to be purchased in a portable reading device;

placing the portable reading device in a receptacle unit located at a check out area of a sales room and transmitting the first set of identification data stored therein to a registration device;

after placing the portable reading device in the receptacle, randomly optically detecting a preset number of products presented for purchase by the customer thereby generating a second set of identification data that is smaller in number that the first set of identification data;

comparing the second set of identification data with the first set of identification data; and generating an actuation signal to complete the purchase of the products or generating a correction signal to interrupt the purchase, depending on the comparison.

9. The method according to claim 8, wherein random optical detection of the products begins immediately after the portable reading device is placed in the receptacle unit, and wherein a shopping cart holding the products is positioned at a specified location and/or wherein a request is made to the customer to place the products to be purchased on a placement table for the optical detection of said products.

10. The method according to claim 8, wherein the second set of identification data for the randomly optically detected products are displayed as image data in a remotely located monitor so that individual products can be identified by a control person and then, by selecting a comparison program a check is carried out to the effect whether the identified product conforms with a product detected by the customer.

11. The method according to claim 8, wherein fewer than one half of all products define the second set of identification data.

12. The method according to claim 8, wherein, after the products are deposited by the customer on the placement table, the comparison between the first set of identification data detected by the portable reading device and the second set of randomly detected identification data does not take place until after the commencement of the payment process and/or after a signal initiated by the customer and the deposition of the products on the placement table.

13. The method according to claim 8, wherein, with payment having been made, a final receipt with a release code is printed so that after the release code is read at an exit door of the sales room, the exit door is opened automatically.

14. A method for verifying the purchase of products in a store, comprising:

giving a portable scanning device to a customer as he enters the store, using the portable scanning device by the customer to scan each product as he travels through the store to thereby generate a plurality of product identification data signals about a plurality of products;

depositing the portable scanning device into a receptacle at a payment unit to begin check out;

sensing the deposit of the portable scanning device into the receptacle;

randomly scanning, by a scanner at the payment unit, a preset number of products presented for check out by the customer, the preset number of products being less than one half of the products presented for check out by the customer; and verifying that the products presented by the customer at the payment unit have been properly scanned by the portable scanning device by comparing information scanned by the payment unit scanner with information scanned by the portable scanning device.

15. The method of claim 14 wherein the randomly scanning is performed by an optical scanner.

16. The method of claim 15 wherein payment at the payment unit is completed without weighing the products.

* * * * *